(12) United States Patent
Wang et al.

(10) Patent No.: US 9,777,881 B2
(45) Date of Patent: Oct. 3, 2017

(54) POLYMER COMPOSITE GROUTING METHOD FOR BLOCKING LEAKING AND SAND INRUSH OF UNDERGROUND PIPELINES

(71) Applicant: SAFEKEY Engineering Technology(Zhengzhou), Ltd., Zhengzhou, Henan (CN)

(72) Inventors: Fuming Wang, Henan (CN); Yanhui Zhong, Henan (CN); Bei Zhang, Henan (CN); Hongliang Chen, Henan (CN); Xiaolong Li, Henan (CN)

(73) Assignee: SAFEKEY Engineering Technology(Zhengzhou), Ltd., Zhengzhou, Henan (CN)

( * ) Notice: Subject to any disclaimer, the term of this patent is extended or adjusted under 35 U.S.C. 154(b) by 36 days.

(21) Appl. No.: 14/969,512

(22) Filed: Dec. 15, 2015

(65) Prior Publication Data

US 2016/0169435 A1    Jun. 16, 2016

(30) Foreign Application Priority Data

Feb. 9, 2015   (CN) .......................... 2015 1 0066618

(51) Int. Cl.
   *F16L 55/175*   (2006.01)
   *F16L 55/18*    (2006.01)

(52) U.S. Cl.
   CPC ................... *F16L 55/175* (2013.01)

(58) Field of Classification Search
   CPC ..... F16L 55/16; F16L 55/1612; F16L 55/168; F16L 55/175; F16L 55/179; F16L 55/18; F16L 1/00; F16L 1/09; F16L 1/10; E02D 37/00
   USPC .......................................... 405/184.1; 138/97
   See application file for complete search history.

(56) References Cited

U.S. PATENT DOCUMENTS

| | | | | | |
|---|---|---|---|---|---|
| 2,917,085 | A | * | 12/1959 | Douse | E03F 3/06 138/97 |
| 3,084,719 | A | * | 4/1963 | Wallace | E03F 3/06 138/97 |
| 4,921,374 | A | * | 5/1990 | Stutzman | F16L 55/175 138/99 |

(Continued)

FOREIGN PATENT DOCUMENTS

FR      2696811 A1 *   4/1994 ............... E03F 3/06

*Primary Examiner* — Benjamin Fiorello
*Assistant Examiner* — Stacy Warren

(57) ABSTRACT

A polymer composite grouting method for blocking leaking and sand inrush of underground pipeline includes steps of: (1) determining a leaking and sand inrush position of an underground pipeline; (2) drilling a plurality of grouting holes in a ground surface; (3) placing two grouting pipes into each of the grouting holes, binding a film bag at a bottom of one of the grouting pipes; (4) injecting a polymer grouting material via one of the grouting pipes to form a polymer sand stabilizing body; (5) extruding water to accumulated in the pipeline; (6) installing a plurality of geotextile bags at the pipeline section displacement; (7) injecting the polymer material into the geotextile bags for blocking the leakage; and (8) filling the pumping area out of the pipeline. The present invention provides a practical technical measure to treat the leaking and sand inrush of the underground pipeline under complicated geological condition.

10 Claims, 4 Drawing Sheets

(56) References Cited

U.S. PATENT DOCUMENTS 4,938,627 A * 7/1990 Lee .......................... E03F 3/06
                                                106/682
9,004,820 B2 * 4/2015 Wang ..................... E21D 21/00
                                                405/259.1
9,045,865 B2 * 6/2015 Wang ..................... E01B 1/002

* cited by examiner

POLYMER COMPOSITE GROUTING METHOD FOR BLOCKING LEAKING AND SAND INRUSH OF UNDERGROUND PIPELINES

CROSS REFERENCE OF RELATED APPLICATION

The present invention claims priority under 35 U.S.C. 119(a-d) to CN 201510066618.2, filed Feb. 9, 2015.

BACKGROUND OF THE PRESENT INVENTION

Field of Invention

The present invention relates to the underground pipeline repair technology, and more particularly to a polymer grouting method for processing leakage and sand inrush caused by the pipeline section displacement of the underground pipeline under complicated geological conditions including soft soil layer, quicksand and the underground river.

Description of Related Arts

The underground pipeline network is an important part of urban infrastructure, is the material basis and the indispensable lifeline for the survival and development of the city. In recent years, with the strengthening of safety awareness and environmental awareness, the safety of the underground pipeline is paid more and more attention.

The underground pipelines belong to hidden works, due to Chinese complex geological conditions, the underground pipelines often encounter mud, soft soil, underground river, sand, and other special geological environment in the building process, if not handled properly, after building the underground pipeline, the pipeline section joint is prone to displace, which results in leakage and sand inrush, if the situation is not serious, the pipeline is blocked and the function thereof is affected, if the situation is serious, the ground surface may be subsided, the traffic is congested, people are damaged, and the security of nearby buildings is threatened. Every year, the direct and indirect economic losses are up to several billion dollars due to leakage and sand inrush of the pipeline.

Existing underground repairing methods are mainly two kinds: one is excavation repairing and pipeline renewing, the other is non-excavation method. The excavation repairing method is excavating the soil layer above the damaged pipeline, partially repairing the damaged pipeline or integrally changing the new pipeline. In spite that the method is capable of effectively solving the pipeline settlement, it has high construction cost and long time limit to a project, residents and traffic in the construction area was severely disrupted. Furthermore, in many cases, dense urban underground infrastructure, ground green area and buildings and busy traffic leave little room for the excavation, so that it is not able to achieve the repair and change of the underground pipeline. The non-excavation method currently includes the cured-in-place-pipe method, the interspersed method, the pipe bursting method, the folding lining method and spraying method. In the cured-in-place-pipe method, one end of the soft pipe impregnated with resin is turned and fixed at an entrance of the pipeline to be repaired, and then an inner layer of the soft pipe impregnated with resin is turned to an external by hydraulic pressure or air pressure and is closely attached to an inner wall of an old pipeline, and then the resin is solidified to form a layer of rigid lining with anticorrosive anti-seepage function which is closely attaching to the inner wall of the old pipeline. Its shortcomings are that the special construction equipment is needed, and it is required for workers to have higher technical level and experience. In the interspersed method, a new pipeline is directly dragged into an old pipeline, and the grouting is performed in an annular gap between the old pipeline and the new pipeline. Its shortcomings are that the flow area of the original pipeline is largely reduced, and the grouting is needed after completing construction. In the pipe bursting method, the front-end steel conical head shatters the old pipeline under the action of the pneumatic hammer or tractor, the lining plastic pipeline goes forward followed by the conical head, and finally the construction of replacing the old pipeline is completed. Its shortcomings are that the excavation of the ground needs to be directly connected, for serious displacement of the original pipeline, the new pipeline may be seriously displaced, and the starting working pit and the receiving working pit are needed to be excavated. In the folding lining method, the pipeline is made of PE or PVC, the geometrical shape of the pipeline is changed to reduce the fracture surface thereof in the factory or the construction site before construction, and then the pipeline with reduced fracture surface is dragged into the original pipeline, when the pipeline is in place, by heating or pressing, the folded pipeline expands and restores the original size and shape, so as to form the lining pipe which is closely attached to the original pipeline. Its shortcoming is there may be structural damage (broken or trend derivation) in construction. In the spraying method, a layer of film is sprayed to an interior of the pipeline by cement mortar or organic chemical pulp for repairing the old pipeline. Its shortcomings are that high requirements for pipeline cleaning and blocking are needed, longer repairing time, limited ability to repair pipeline defects, time and energy waste and instable quality. In spite that these methods are able to solve the structure deficiency and water leakage of the underground pipeline, most of them need to empty the water accumulated in the pipeline and then the construction is operated. If the quick sand and other complex geological conditions exist outside the leakage position of the pipeline, the quick sand continuously enters into the pipeline while pumping, which results in the pumping area of the quick sand, if seriously, even leads to the ground subsidence. Therefore, it is urgent to develop a new method for blocking leaking and sand inrush of an underground pipeline under complex geological conditions.

The polymer grouting technology is the foundation rapid reinforcement technology developed in 1970s. In the technology, the non-aqueous reaction type two-component polymer material is injected into the foundation, two materials rapidly reacting, expanding and solidifying after mixing to reinforce the foundation, filling the pumping area or promoting the floor. The polymer material has light quality, fast response, good durability, and excellent anti-seepage performance. Currently, the polymer grouting technology is mainly applied to roads, tunnels, dams and other large infrastructure seepage, consolidation and restoration projects. The present invention aims at the deficiencies of the underground pipeline repairing technology under complex geological conditions in China, and combines the polymer film bag grouting technology, the polymer pipe grouting technology with the polymer geotextile bag grouting technology to develop a polymer composite grouting method for blocking leaking and sand inrush of an underground pipeline. China has no relevant reports.

SUMMARY OF THE PRESENT INVENTION

An object of the present invention is to provide a new polymer composite grouting method for blocking leaking and sand inrush of an underground pipeline, aiming at the problem of leaking and sand inrush under complicated geological conditions, so as to provide an advance, highly efficient, economical and practical technical measures to treat the leaking and sand inrush of the underground pipeline under complicated geological condition.

The present invention is achieved by the following technical solution.

Aiming at the leaking and sand inrush of the underground pipeline caused by soft soil, quicksand, underground river and other adverse geological conditions, firstly by combining the polymer film bag grouting technique with the polymer pipe grouting technique, construct the polymer sand stabilizing body at two sides of the leaking and sand inrush position of the pipeline, so as to avoid the quicksand to enter into the pipeline while pumping, and then empty the water accumulated in the pipeline, and a constructor enters into the pipeline to effectively block the leaking and sand inrush position by the polymer geotextile bag grouting method.

The method provided by the present invention specifically comprises steps of:

(1) determining a leaking and sand inrush position of an underground pipeline: which specially comprises steps of comprehensively detecting the underground pipeline by a GPR (ground penetrating radar), and determining the leaking and sand inrush position needed to be treated;

(2) drilling a plurality of grouting holes in a ground surface: which specially comprises steps of arranging a plurality of grouting holes at two sides of the leaking and sand inrush position of the pipeline in the ground surface with equal space, wherein a distance between every two grouting holes is 30 cm-50 cm and an aperture of each of the grouting holes is 9 cm, and drilling downwardly the grouting holes from the ground surface by a drilling equipment till a depth of each of the grouting holes reaches 30 cm below the pipeline;

(3) placing a plurality of grouting pipes: which specially comprises steps of placing two grouting pipes into each of the grouting holes, binding a film bag at a bottom of one of the grouting pipes and fixing an opening end of the film bag with one of the grouting pipes via a hoop, wherein a diameter of the film bag is 40 cm and a length thereof is 1.2-1.5 times a diameter of one of the grouting pipes, and the other of the grouting pipes is not bound with the film bag;

(4) polymer grouting: which specially comprises steps of firstly injecting a polymer grouting material into the film bag via one of the grouting pipes, the polymer grouting material rapidly expanding and solidifying in the film bag to form a polymer film bag pile, and then injecting the polymer grouting material into a soil at an interspace of the polymer film bag pile via the other of the grouting pipes, the polymer grouting material forming a polymer curtain after expansion and solidification, and combining the polymer film bag pile with the polymer curtain to form a polymer sand stabilizing body, so as to avoid sand inrush while extruding water accumulated in the pipeline;

(5) extruding the water accumulated in the pipeline: which specially comprises a step of emptying the water accumulated in the pipeline via a pumping equipment;

(6) installing a plurality of geotextile bags: which specially comprises a step of a constructor installing the geotextile bags at the pipeline section displacement after entering into the pipeline, wherein an amount of the geotextile bags is determined by a length of the pipeline section displacement;

(7) injecting the polymer material into the geotextile bags: which specially comprises a step of according to a grouting order from two sides to a center, injecting the polymer material into each of the geotextile bags via a grouting pipe in sequence;

(8) blocking the leakage: which specially comprises steps of the polymer material rapidly expanding and solidifying in each of the geotextile bags for filling gaps at the pipeline section displacement, so as to block the leakage; and (9) filling the pumping area out of the pipeline: which specially comprises steps of evenly arranging a plurality of holes at two sides of the pipeline section displacement, wherein an amount of the holes is determined by site construction situation, and then inserting a grouting pipe into each of the holes, injecting the polymer material into the pumping area caused by leaking and sand inrush out of the pipeline via the grouting pipe, the polymer material reacting and then rapidly expanding and solidifying to fill the pumping area caused by leaking and sand inrush out of the pipeline.

In the above method, the polymer material is a non-aqueous reaction type two-component polymer material.

The polymer composite grouting method for blocking leaking and sand inrush of an underground pipeline of the present invention is adapted for repairing the leaking and sand inrush of the underground pipeline under soft soil, quicksand, the underground river and other adverse geological conditions. Compared with the conventional repairing technique, the present invention has some characteristics as follows:

(1) Effectively avoid leaking and sand inrush. The composite grouting technique combining the polymer film bag grouting and the polymer pipe grouting is capable of effectively solving the leaking and sand inrush of the pipeline.

(2) Low cost. Compared with the conventional repairing technique, the present invention is capable of saving the cost more than 60%.

(3) Little impact on the surrounding environment. While constructing, a plurality of grouting holes are needed to be drilled in the ground, so that it has little impact on the surrounding environment.

(4) Simple process and fast construction. Drilling and grouting are able to continuously be operated, the construction is fast, about 90% strength is able to be formed after material reaction for 15 minutes, the present invention is able to save a time limit for a project more than 70%.

(5) Convenient construction. The polymer grouting equipment is adapted for different sites and is convenient for in and out.

(6) Excellent durability. The non-aqueous reaction type two-component polymer material adopted by the present invention has stable performance and good corrosion resistance to chemical solvents after long-term buried in the underground.

All in all, the polymer composite grouting method for blocking leaking and sand inrush of an underground pipeline of the present invention has an obvious novelty on the technical principles and construction methods. This special grouting method has some characteristics of fast construction, low cost, good maintenance effect and no disturbance to the pipeline, and is adapted for treating the leaking and sand inrush of the underground pipeline under soft soil, quicksand, the underground river and other adverse geological conditions, which shows great economic, social and broad application prospects, and is important to promote the conservation level of the urban underground pipeline.

These and other objectives, features, and advantages of the present invention will become apparent from the following detailed description, the accompanying drawings, and the appended claims.

DETAILED DESCRIPTION OF THE PREFERRED EMBODIMENT

The present invention is further explained with the accompanying drawings.

Figure 1:
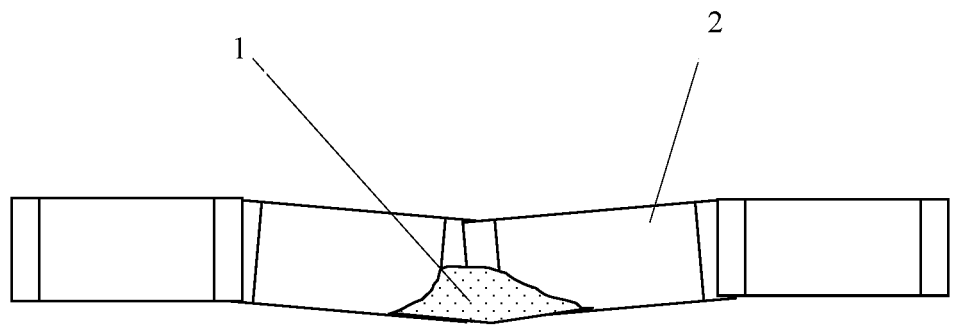
FIG. 1 is a longitudinally cross-sectional schematic diagram of an underground pipeline displacement of the present invention.
Figure 2:
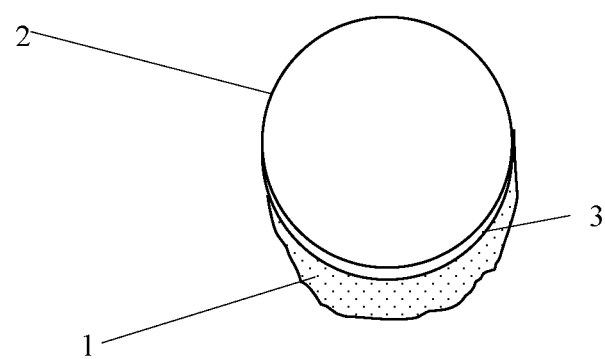
FIG. 2 is a transversely cross-sectional schematic diagram of the underground pipeline displacement of the present invention.

(1) Determine a leaking and sand inrush position of an underground pipeline: which specially comprises steps of comprehensively detecting the underground pipeline by a GPR (ground penetrating radar), and determining the leaking and sand inrush position needed to be treated, as shown in FIGS. 1 and 2, wherein a pumping area caused by leaking and sand inrush is labeled as "1", a pipeline section is labeled as "2", and a pipeline section displacement is labeled as "3".

Figure 3:
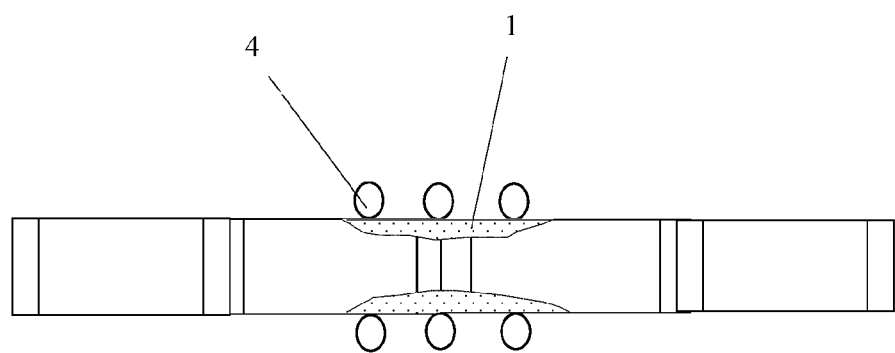
FIG. 3 is a layout chart of a plurality of grouting holes of the present invention.
Figure 4:
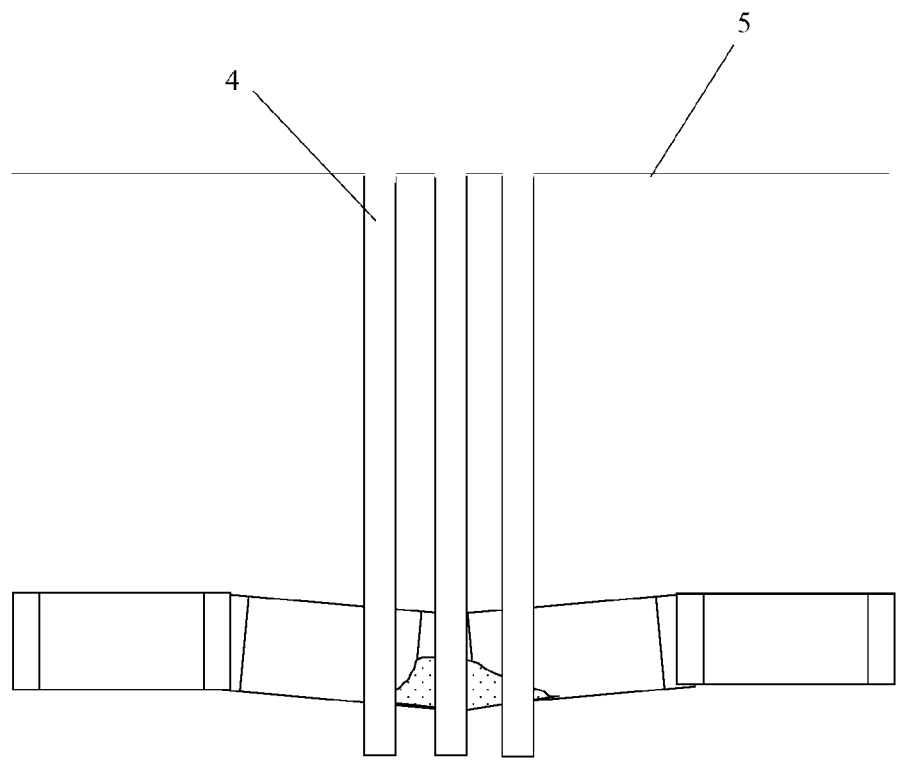
FIG. 4 is a longitudinally cross-sectional schematic diagram of the grouting holes of the present invention.

(2) Drill a plurality of grouting holes in a ground surface: which specially comprises steps of evenly arranging a plurality of grouting holes 4 at two sides of the pumping area 1 caused by leaking and sand inrush of the pipeline, as shown in FIG. 3, wherein a distance between every two grouting holes is 30 cm-50 cm and an aperture of each of the grouting holes is 9 cm, and drilling downwardly the grouting holes 4 from the ground surface 5 by a drilling equipment till a depth of each of the grouting holes reaches 30 cm below the pipeline, as shown in FIG. 4.

Figure 5:
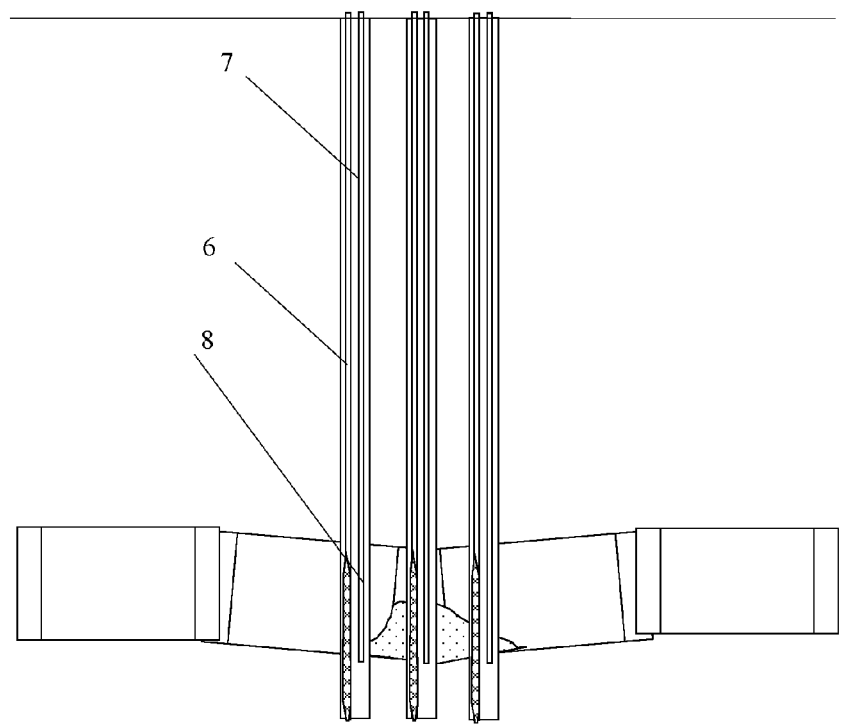
FIG. 5 is a schematic view of arranging grouting pipes in the grouting holes.

(3) Place a plurality of grouting pipes: which specially comprises steps of from left to right, placing a grouting pipe 6 and a grouting pipe 7 into each of the grouting holes 4, binding a film bag 8 at a lower end of the grouting pipe 6 and fixing an opening end of the film bag with the grouting pipe 6 via a hoop, wherein a diameter of the film bag is 40 cm and a length thereof is 1.2-1.5 times a diameter of the grouting pipe 6, as shown in FIG. 5.

Figure 6:
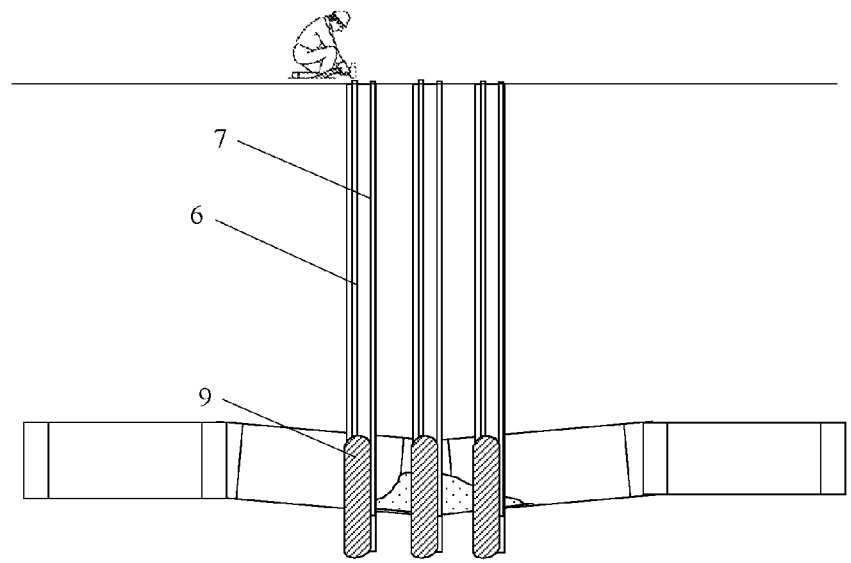
FIG. 6 is a schematic view of a polymer film bag pile.
Figure 7:
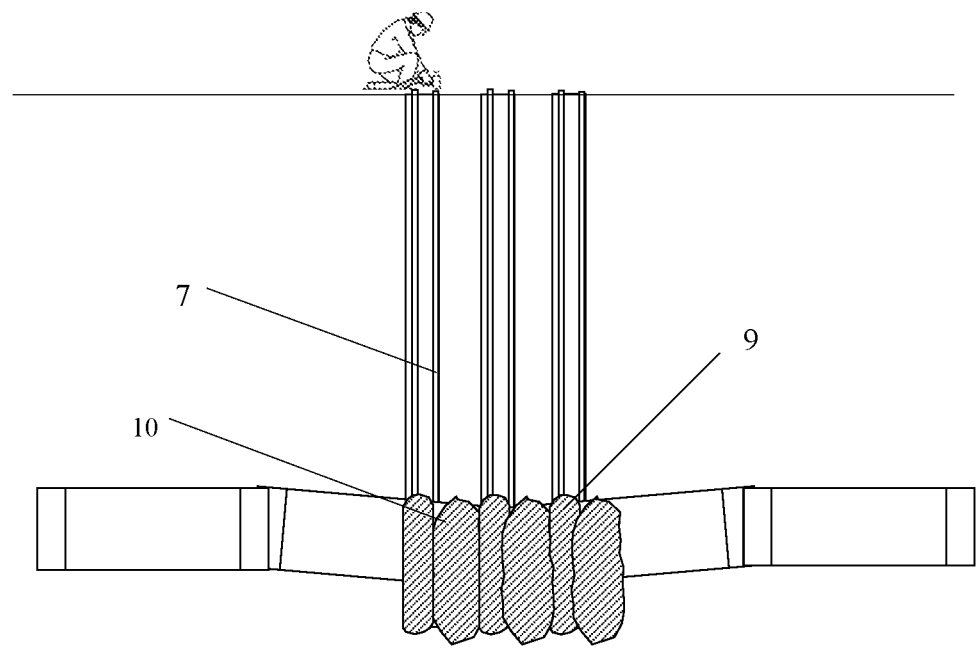
FIG. 7 is a schematic view of a polymer curtain and a polymer sand stabilizing body.

(4) Polymer grouting: which specially comprises steps of firstly injecting a polymer grouting material into the film bag 8 via the grouting pipe 6, the polymer grouting material rapidly expanding and solidifying in the film bag 8 to form a polymer film bag pile 9, as shown in FIG. 6, and then injecting the polymer grouting material into a soil at an interspace of the polymer film bag pile 9 via the grouting pipe 7, the polymer grouting material forming a polymer curtain 10 after expansion and solidification, and combining the polymer film bag pile 9 with the polymer curtain 10 to form a polymer sand stabilizing body, as shown in FIG. 7, so as to avoid sand inrush while extruding water accumulated in the pipeline.

(5) Extrude the water accumulated in the pipeline: which specially comprises a step of emptying the water accumulated in the pipeline via a pumping equipment.

Figure 8:
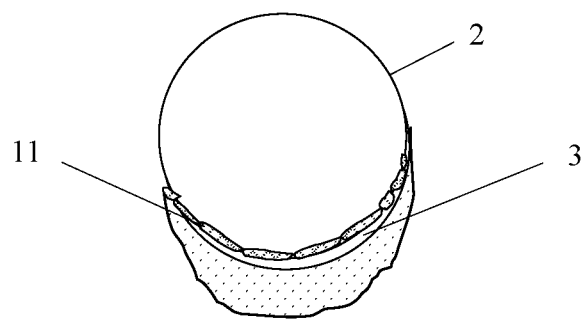
FIG. 8 is a schematic view of arranging a plurality of geotextile bags at the pipeline displacement.

(6) Install a plurality of geotextile bags: which specially comprises a step of a constructor installing the geotextile bags 11 at the pipeline section displacement 3 after entering into the pipeline, as shown in FIG. 8, wherein an amount of the geotextile bags is determined by a length of the pipeline section displacement 3.

(7) Inject the polymer material into the geotextile bags: which specially comprises a step of according to a grouting order from two sides to a center, injecting the polymer material into each of the geotextile bags 11 via a grouting pipe 12 in sequence.

(8) Block the leakage: which specially comprises steps of the polymer material rapidly expanding and solidifying in each of the geotextile bags for filling gaps at the pipeline section displacement, so as to block the leakage.

Figure 9:
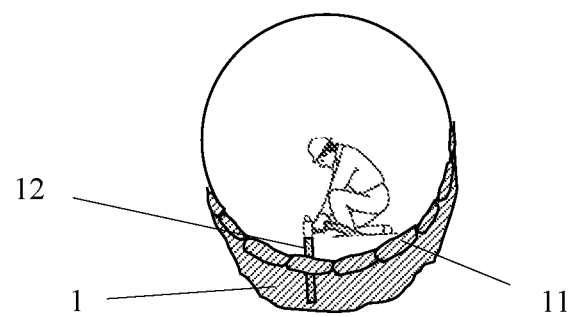
FIG. 9 is a schematic view of grouting and filling a pumping area caused by leaking and sand inrush.

(9) Fill the pumping area out of the pipeline: which specially comprises steps of evenly arranging a plurality of holes at two sides of the pipeline section displacement 3, injecting the polymer material into the pumping area 1 caused by leaking and sand inrush out of the pipeline via the grouting pipe 12, the polymer material reacting and then rapidly expanding and solidifying to fill the pumping area 1 caused by leaking and sand inrush out of the pipeline, as shown in FIG. 9.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A polymer composite grouting method for blocking leaking and sand inrush of an underground pipeline by combining a polymer film bag grouting technique with a polymer pipe grouting technique during leaking and sand inrush of the underground pipeline, constructing a polymer sand stabilizing body at two sides of a leaking and sand inrush position of the pipeline, emptying water accumulated in the pipeline, and entering into the pipeline to comprehensively block the leaking and sand inrush position by a polymer geotextile bag grouting technique, the method comprising the steps of:

(1) comprehensively detecting the underground pipeline by a GPR (ground penetrating radar), and determining the leaking and sand inrush position needed to be treated;

(2) drilling downwardly from a ground surface to a depth of 30 cm below the pipeline to form a plurality of equally spaced grouting holes on both sides of the leaking and sand inrush position of the pipeline;

(3) placing a first grouting pipe and a second grouting pipe into each of the grouting holes, binding a film bag at a bottom of each of the first grouting pipes by fixing an opening end of the film bag with the respective first grouting pipe, wherein the respective second grouting pipe is not bound with the respective film bag;

(4) injecting a first amount of polymer grouting material into each film bag via the respective first grouting pipe, the first amount of the polymer grouting material expanding and solidifying in the film bag to form a polymer film bag pile, and then injecting a second amount of the polymer grouting material into a soil at interspaces of the polymer film bag piles via the respective second grouting pipes, the second amount of the polymer grouting material forming a respective polymer curtains after expansion and solidification, and then combining the polymer film bag piles with the polymer curtains to form a polymer sand stabilizing body;

(5) extruding the water accumulated in the pipeline via a pumping equipment;

(6) installing, from the interior of the pipeline, a plurality of geotextile bags at a pipeline section displacement located at the leaking and sand inrush position;

(7) injecting a third amount of the polymer grouting material into the geotextile bags; and (8) evenly arranging a plurality of holes in the geotextile bags at both sides of the pipeline section displacement, wherein an amount of the holes is determined by site construction, and then inserting a third grouting pipe into each of the holes, and injecting a fourth amount of the polymer grouting material into a pumping area caused by sand inrush and leaking out of the pipeline via the respective third grouting pipes, the fourth amount of the polymer material reacting and then expanding and solidifying to fill the pumping area.

2. The polymer composite grouting method, as recited in claim 1, wherein a distance between every two grouting holes is 30 cm-50 cm and a diameter of each of the grouting holes is 9 cm.

3. The polymer composite grouting method, as recited in claim 2, wherein the polymer grouting material is a non-aqueous reaction type two-component polymer material.

4. The polymer composite grouting method, as recited in claim 1, wherein a diameter of the film bag is 40 cm and a length thereof is 1.2-1.5 times a diameter of the first grouting pipe.

5. The polymer composite grouting method, as recited in claim 4, wherein the polymer grouting material is a non-aqueous reaction type two-component polymer material.

6. The polymer composite grouting method, as recited in claim 1, wherein an amount of the geotextile bags is determined by a length of the pipeline section displacement.

7. The polymer composite grouting method, as recited in claim 6, wherein the polymer grouting material is a non-aqueous reaction type two-component polymer material.

8. The polymer composite grouting method, as recited in claim 1, wherein the step of injecting the polymer grouting material into the geotextile bags comprises injecting the third amount of the polymer grouting material into each of the geotextile bags via the third grouting pipes sequentially from two sides to a center of the pipeline section displacement, the third amount of the polymer grouting material expanding and solidifying in each of the geotextile bags and filling gaps at the pipeline section displacement so as to block a leakage.

9. The polymer composite grouting method, as recited in claim 8, wherein the polymer grouting material is a non-aqueous reaction type two-component polymer material.

10. The polymer composite grouting method, as recited in claim 1, wherein the polymer grouting material is a non-aqueous reaction type two-component polymer material.

* * * * *